Jan. 26, 1965 R. P. FRICK ETAL 3,166,837
METHOD AND APPARATUS FOR MAKING DOME-LIKE
HOLLOW METAL STRUCTURE
Filed Aug. 10, 1961

INVENTOR.
ROBERT P. FRICK AND
MARVIN W. MASCHKE,
BY
ATTORNEYS.

United States Patent Office 3,166,837
Patented Jan. 26, 1965

3,166,837
METHOD AND APPARATUS FOR MAKING DOME-LIKE HOLLOW METAL STRUCTURE
Robert P. Frick, Mount Healthy, and Marvin W. Maschke, Cincinnati, Ohio, assignors to The Metal Specialty Company, Cincinnati, Ohio, a corporation of Ohio
Filed Aug. 10, 1961, Ser. No. 130,533
7 Claims. (Cl. 29—421)

This invention relates to a method of making a dome-like hollow metal article. In the Rieppel et al. Patent No. 2,779,086 dated January 29, 1957, there is disclosed a method of making a hollow metal structure by the application between the outer sheets or layers of a sheet metal sandwich of an internal forming pressure tending to form these outer sheets or layers to the internal configuration of restricting dies. This was accomplished by providing metal composites or laminates in which there was an intermediate layer of a metal of lower melting point than the melting points of the covering of the outer metals. The sandwich could be bonded into a unitary laminate by application of heat.

The above identified patent taught that if the sheet were placed between restricting dies which had grooves in them and if gas pressure were introduced between the outer meal sheets and between the dies and the die was heated to at least the melting point of the intermediate layer metal but below the melting points of the outer sheets, the laminate could, as it were, be blown up or inflated so that the two outer sheets would conform to the internal configuration of the restricting dies. In this way it was possible to provide a unitary structure in the form of a laminated sheet having a network or passages therein such as could be used conveniently for heat exchangers and the like.

Proceeding from the teachings of the above mentioned patent, we have attempted to form dome-like hollow metal articles which would be useful as pressure accumulators, vacuum tanks and the like where it is desired to form a metal article having a single large hollow space. In following the teachings of the Rieppel patent, we prepared dies having internal dome-like configurations and clamped a sheet, such as disclosed in the Rieppel patent, between these dies, heated the dies and applied gas pressure as taught by Rieppel et al. We found that the two outer sheets were in fact inflated such as to conform to the inner surfaces of the respective dies but we found that we could not make satisfactory hollow metal structures of the nature herein outlined because where the outer sheets came in contact with the dome-like interior configuration of the die, the outer sheets would burn through and destroy the article which we were trying to make.

While we do not wish to be bound by theory, we believe that the heat applied against the stretched dome-like configuration of the article, together with the oxygen in the air used to inflate the sheets, caused alloying of zinc and aluminum with an attendant burning through. This burning through cannot apparently be cured by the use of an inert gas alone.

Accordingly, it is an object of our present invention to provide a method of making a salable hollow metal article as outlined above and to provide apparatus and a method for accomplishing the production of such a hollow metal article without damage to the structure by burning through.

These and other objects of the invention which will be described in more detail hereinafter or which will become apparent to one skilled in the art upon reading these specifications, we accomplish by that certain construction and arrangement of parts and by that series of method steps of which we shall now describe exemplary embodiments.

Reference is made to the drawings forming a part hereof and in which.

Briefly, in the practice of our invention, we have discovered that hollow metal articles as outlined above can be successfully formed if the metal sheets are not required to conform to the interior configuration of a die, that is, if the composite sheet is simply clamped firmly between annular or ring-like dies whose internal periphery conforms to the medial outline of the article which it is desired to produce.

Figure 1:
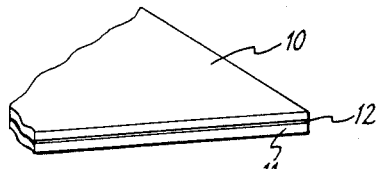
FIGURE 1 is a fragmentary perspective view of a composite sheet used in the practice of our invention.
Figure 2:
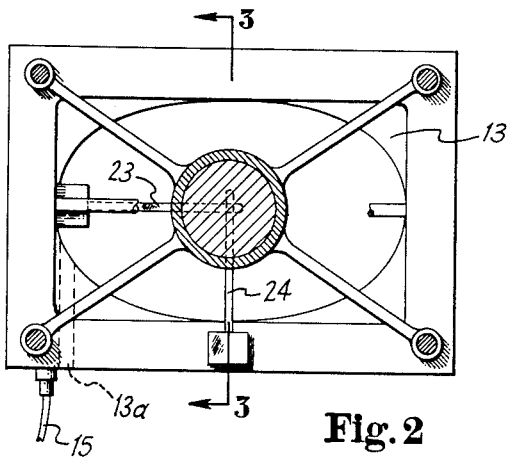
FIGURE 2 is a plan view of a die and portions of a press for producing the article.

Referring now in more detail to the drawing, we have shown in FIGURE 1 a typical sheet which may be used in the practice of our invention. This sheet may comprise the outer layers 10 and 11 and the intermediate layer 12. While we do not intend to limit ourselves to the particular metals used, we have successfully formed the operations hereinafter described with a sandwich composed of outer layers 10 and 11 of aluminum and an intermediate layer 12 of zinc. Similarly, the dimensions of the layers are not highly critical and we have successfully formed hollow metal articles with the aluminum outer layers having a thickness from .30 inch to .080 inch, although we prefer a thickness from .050 to .060 inch.

The zinc intermediate layer 12 is generally quite thin and we prefer that the zinc layer have a thickness from .0006 inch to .001 inch although we have formed satisfactory articles with a zinc thickness up to .003 inch. We find that a thickness from about .0006 inch to .001 inch is highly satisfactory regardless of the thickness of the two sheets of aluminum.

Figure 3:
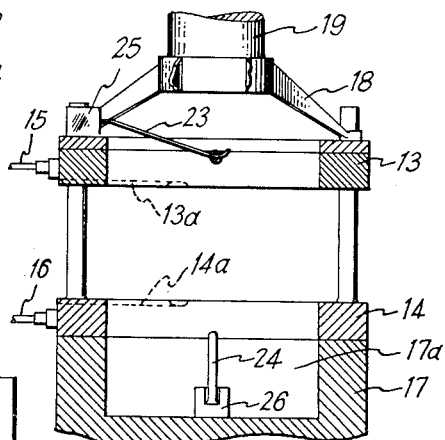
FIGURE 3 is a fragmentary cross-sectional view taken on the line 3—3 of FIGURE 2.

The ring dies are shown in the figures at 13 and 14. In the particular embodiment shown, these dies have a generally eliptical internal periphery. This is not a limitation upon the invention since the internal periphery of the dies may be circular, eliptical, oval, or even multilateral with rounded corners. Means are provided as is well known in the art for heating the dies 13 and 14. We have not shown details of these means since they do not constitute a part of the invention but these means may be electrical heating elements energized through the leads 15 and 16. Each of the dies will have a groove, as at 13a and 14a in FIGURE 3, to accommodate a needle through which air or gas may be introduced between the outer sheets 10 and 11.

The means for heating the dies must be capable of heating these dies to a temperature of at least the melting point of the intermediate layer and in the event the intermediate layer is zinc, these dies should be capable of heating to from 800° F. to 850° F. This is above the melting point of zinc but below the melting point of aluminum.

The lower die 14 is mounted upon the bed 17 of a suitable hydraulic press or the like and the upper die 13 is mounted by means of bolts or the like to a spider member 18 which is secured to the ram 19 of the hydraulic press. The bed 17 of the machine is provided with the hollow area or depression 17a to permit the expansion of the lower sheet 11.

The sandwich, composed of the two outer sheets 10 and 11 and the intermediate layer 12, is placed between the dies 13 and 14 and clamping pressure is exerted by means of the hydraulic press. Air pressure or gas pressure used to inflate the article will depend of course upon the thickness of the sheets which are to be inflated. We find that with the apparatus and the method herein described, we can use a lower pressure than was necessary in the Rieppel et al. patent referred to above and we can operate successfully with pressures from 50 to 100 p.s.i. The clamping pressure pressing the dies 13 and 14 toward each other should be on the order of 1,000 p.s.i.

Figure 4:
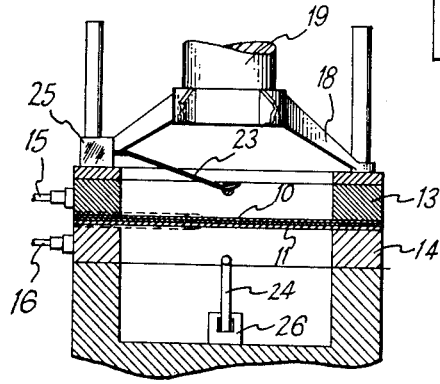
FIGURE 4 is a view similar to FIGURE 3 showing the dies clamped together ready for the inflation step.
Figure 5:
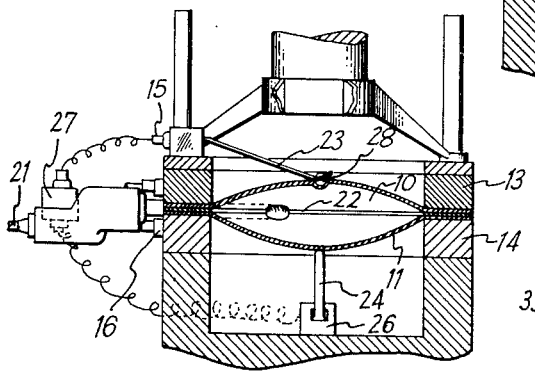
FIGURE 5 is a view similar to FIGURE 4 showing the hollow metal article in its inflated condition.

With the sandwich sheet clamped between the ring dies as in FIGURE 4, a suitable needle 20 is inserted as shown in FIGURE 5 between the outer sheets 10 and 11 and through the layer 12 in the channel provided by the cooperating grooves 13a and 14a referred to above, and air or gas is then injected through the needle from a supply line 21.

With the dies heated as described above, the intermediate layer of zinc melts whereby the needle can be inserted as just described and whereby when pressure is applied, the two outer sheets 10 and 11 separate and bulge outwardly, thus providing the hollow metal article. If the gauges of the sheets 10 and 11 are carefully controlled, the hollow metal article will be symmetrical about a medial line 22. If one sheet is slightly thicker than the other, the thicker sheet will not be distorted as much as the thinner sheet, and the article will not be symmetrical.

It will often be desirable to produce a number of hollow metal articles of the same dimensions and we, therefore, provide control for the amount of inflation. Thus, as shown in FIGURES 2, 3, 4 and 5, we provide upper and lower contact arms 23 and 24. These are arranged to extend to a point substantially at the center of the respective ring dies and they are connected at their other ends in the well known manner to the switches 25 and 26. Thus, when the inflated article contacts either of the arms 23 or 24, the respective switch 25 or 26 is actuated and the switches 25 and 26 are suitably connected to a solenoid operated valve 27 to close the same when either of the switches 25 or 26 is actuated. Thus, when the inflated hollow metal article reaches a desired dimension, the pressure is automatically cut off. As soon as the pressure is cut off, the formed article is removed from the die and permitted to cool.

In the production of such things as vacuum tanks or the like, the nature of the installation may involve a frame element or a conduit or some other obstruction to the suitable mounting of the tank, and we, therefore, provide means for forming in the hollow metal article an indentation if this is desired. For example, in the figures we have shown a bar 28, which may be simply a cold steel bar, extended across the upper die (or if desired the lower die) in such manner with relation to the arrangement of the arm 23 that as the upper layer 10 is inflated, it is inflated about the bar 28 thereby producing in the upper dome-like portion of the hollow metal article a groove 29. Such a groove may be of assistance in the mounting of the completed article in the place where it is to be used either as a locating element or to permit the passage of a conduit or a structural frame member.

Figure 6:
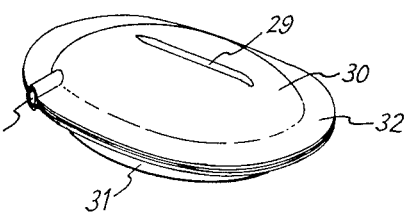
FIGURE 6 is a perspective view of a typical finished article.

In FIGURE 6, we have shown the complete structure having now the upper dome-like portion 30 and the lower dome-like portion 31 and having an annular medial flange 32 with the duct 33 communicating between the interior of the structure and the outside. It will, of course, be understood that the duct 33 can be formed at any desired location and that a plurality of such ducts may be provided as desired. It will also be understood that if a float member is desired with no communicating duct, the duct 33 may be either plugged or rolled down.

We find that we have been able to produce a hollow metal article in which the dome-like portions 30 and 31 may extend as much as four inches above and below the medial flange 32 and we find that with such a degree of inflation, starting with a sandwich in which the aluminum sheets have a thickness of .050 inch, the final thickness of the portions 30, 31 will be about .030 inch.

It will be clear that numerous modifications may be made without departing from the spirit of the invention and we therefore do not intend to limit ourselves otherwise than as set forth in the claims which follow.

Having now fully described our invention, what we claim as new and desire to secure by Letters Patent is:

1. The method of making a hollow metal article which includes the steps of providing a foundation of two sheets of metal with an intermediate bonding layer of a metal of lower melting point than that of said two sheets, providing a pair of annular clamping members, the inner peripheries of which coincide substantially with the desired medial outer periphery of said hollow metal article, clamping said sandwich tightly between said clamping members, heating said clamping members to a temperature above the melting point of the metal of said bonding layer but below the melting point of said two sheets, and injecting a gas under pressure between said two sheets and between said clamping members into the area within said annular clamping members whereby to force said two sheets apart into opposed dome-like configuration within said annular clamping members, removing the hollow metal article thus formed from between said clamping members and immediately permitting said hollow metal article to cool.

2. The method of claim 1, including the step of causing one of said sheets in the process of deformation to cut off the flow of gas under pressure to terminate the forming operation.

3. The method of claim 1, including the steps of interposing a cold forming element in the path of a sheet being deformed to modify the dome-like configuration of said hollow metal article.

4. Apparatus for producing a hollow metal article from a sandwich of two sheets of metal with an intermediate bonding layer of metal of a lower melting point than that of said two sheets, comprising a pair of annular clamping members, means for heating said clamping members to a temperature sufficient to melt said bonding layer, means for tightly pressing said annular clamping members together to grip said sandwich therebetween, means for introducing a gas under pressure between said clamping members and said two sheets when they are clamped between said annular clamping members, to cause said two sheets to separate within said annular clamping members and to form opposed, dome-like shells.

5. Apparatus according to claim 4, wherein actuating means are provided substantially centrally of one at least of said clamping rings and spaced from said clamped sandwich a distance equal to the desired height of said dome-like shell and wherein means are provided to cut off the flow of gas under pressure in response to actuation of said actuating means by one of said sheets upon contact with said actuating means.

6. Apparatus according to claim 5, wherein actuating means are provided substantially centrally of both of said clamping rings and equally spaced from said clamped sandwich on opposite sides thereof a distance equal to the desired height of said dome-like shells, and wherein means are provided to cut off the flow of gas under pressure in response to actuation of either of said actuating means by one of said sheets upon contact with the respective actuating means.

7. Apparatus according to claim 4, wherein cold metallic means are interposed in the path of inflation of said hollow metal article to modify the dome-like configuration thereof.

References Cited by the Examiner
UNITED STATES PATENTS

| | | | |
|---|---|---|---|
| 918,619 | 4/09 | Weber | 113—92 X |
| 1,966,241 | 7/34 | Furrer | 220—3 |
| 2,779,086 | 1/57 | Rieppel et al. | 29—157.3 |
| 2,859,892 | 11/58 | Daley | 220—3 |
| 2,912,951 | 11/59 | Peters | 29—421 X |
| 2,993,268 | 7/61 | Wells | 29—421 |
| 3,024,525 | 3/62 | Wisberger | 29—421 |

WHITMORE A. WILTZ, *Primary Examiner.*